US011839971B2

(12) United States Patent
Murakami et al.

(10) Patent No.: US 11,839,971 B2
(45) Date of Patent: Dec. 12, 2023

(54) TEACHING CONTROL METHOD FOR ROBOT, ROBOT SYSTEM, AND COMPUTER PROGRAM

(71) Applicant: Seiko Epson Corporation, Tokyo (JP)

(72) Inventors: Hiroki Murakami, Matsumoto (JP); Takahiko Noda, Kiso (JP)

(73) Assignee: SEIKO EPSON CORPORATION

( * ) Notice: Subject to any disclaimer, the term of this patent is extended or adjusted under 35 U.S.C. 154(b) by 190 days.

(21) Appl. No.: 17/381,365

(22) Filed: Jul. 21, 2021

(65) Prior Publication Data

US 2022/0024029 A1 Jan. 27, 2022

(30) Foreign Application Priority Data

Jul. 22, 2020 (JP) ................................. 2020-125031

(51) Int. Cl.
*B25J 9/16* (2006.01)
*B25J 9/00* (2006.01)
*G05B 19/425* (2006.01)

(52) U.S. Cl.
CPC ........... *B25J 9/0081* (2013.01); *B25J 9/1651* (2013.01); *G05B 19/425* (2013.01); *G05B 2219/40123* (2013.01)

(58) Field of Classification Search
CPC ..... B25J 9/0081; B25J 9/1651; G05B 19/425; G05B 2219/40123; G05B 2219/43129; G06F 3/04847
See application file for complete search history.

(56) References Cited

U.S. PATENT DOCUMENTS

| | | | |
|---|---|---|---|
| 9,844,877 B1* | 12/2017 | Jules | B25J 9/1664 |
| 2001/0021880 A1* | 9/2001 | Kato | G05B 19/4103 |
| | | | 700/160 |
| 2005/0107921 A1* | 5/2005 | Watanabe | G05B 19/425 |
| | | | 700/253 |
| 2006/0212170 A1* | 9/2006 | Nagatsuka | G05B 19/4207 |
| | | | 700/245 |
| 2016/0274784 A1* | 9/2016 | Yui | G05B 19/409 |
| 2018/0281173 A1 | 10/2018 | Hane et al. | |
| 2020/0070281 A1* | 3/2020 | Takeda | B23K 26/032 |
| 2020/0171656 A1* | 6/2020 | Diankov | B25J 9/163 |
| 2021/0394453 A1* | 12/2021 | Lalonde | B29C 64/393 |

FOREIGN PATENT DOCUMENTS

| | | |
|---|---|---|
| JP | H06-099378 A | 4/1994 |
| JP | H06-102919 A | 4/1994 |
| JP | H08-328637 A | 12/1996 |
| JP | 2018-176288 A | 11/2018 |

\* cited by examiner

*Primary Examiner* — Dale Moyer
(74) *Attorney, Agent, or Firm* — Harness, Dickey & Pierce, P.L.C.

(57) ABSTRACT

A teaching control method includes displaying three or more plurality of teaching points on a display section, acquiring a result of classification processing for classifying the plurality of teaching points into one or more teaching point groups, receiving an operation parameter for each teaching point group, and setting an operation value for each teaching point group using the operation parameter.

6 Claims, 7 Drawing Sheets

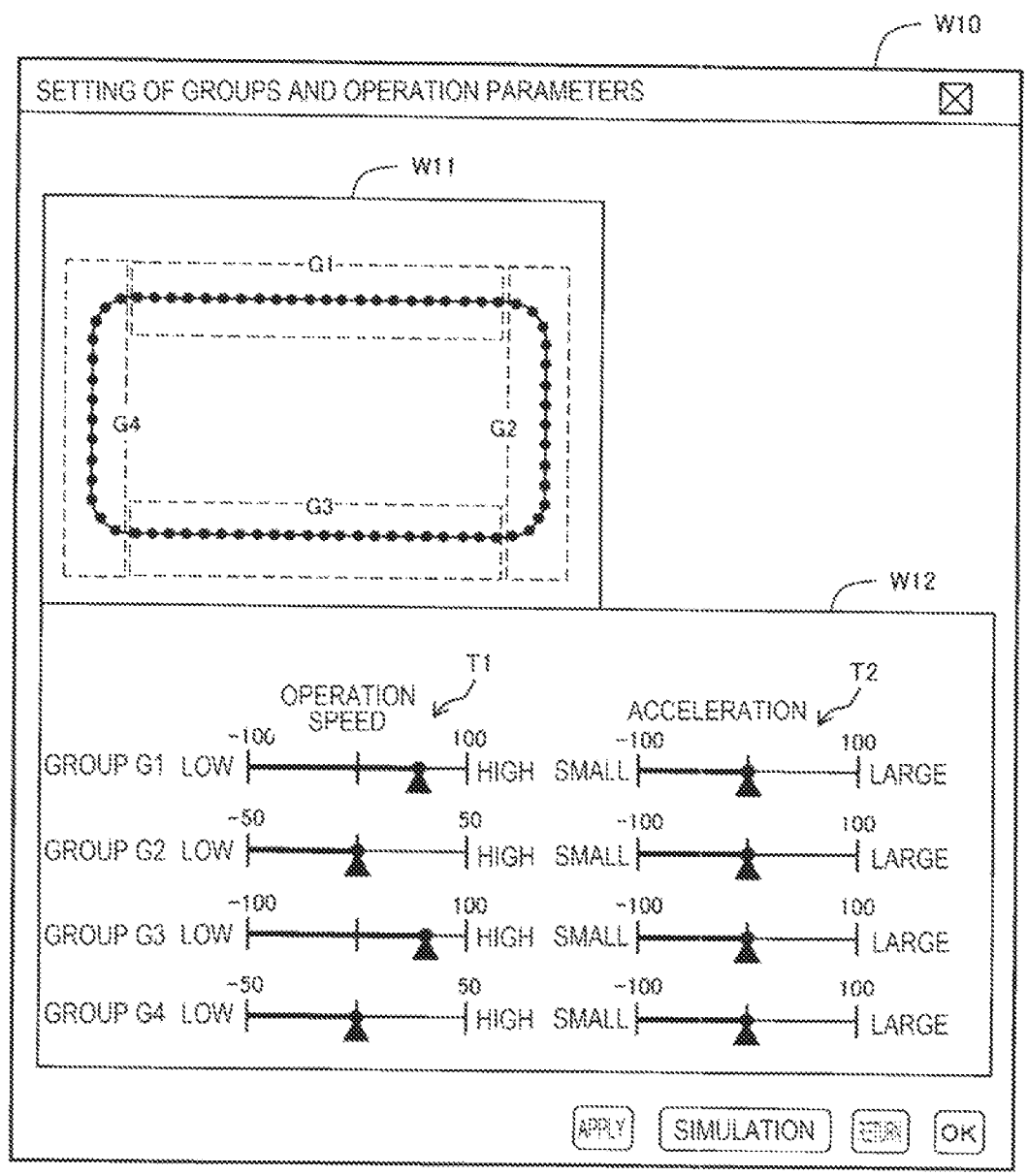

TEACHING CONTROL METHOD FOR ROBOT, ROBOT SYSTEM, AND COMPUTER PROGRAM

The present application is based on, and claims priority from JP Application Serial Number 2020-125031, filed Jul. 22, 2020, the disclosure of which is hereby incorporated by reference herein in its entirety.

BACKGROUND

1. Technical Field

The present disclosure relates to a teaching control method for a robot, a robot system, and a computer program.

2. Related Art

JP-A-8-328637 (Patent Literature 1) discloses a method of, when creating an operation program for a robot, setting speed for each teaching point pair formed by adjacent two teaching points.

However, the operation program for the robot includes a large number of teaching points. An operator has to set speeds for respective teaching point pairs. Therefore, teaching work is complicated. Such a problem also occurs when other operation values such as acceleration and force are set for a plurality of teaching points.

SUMMARY

According to a first aspect of the present disclosure, there is provided a teaching control method for creating an operation program for a robot. The teaching control method includes: (a) acquiring three or more plurality of teaching points; (b) displaying the plurality of teaching points on a display section; (c) acquiring a result of classification processing for classifying the plurality of teaching points into one or more teaching point groups, at least one of the one or more teaching point groups including at least three teaching points among the plurality of teaching points; (d) receiving an operation parameter used to set an operation value for each teaching point group among the one or more teaching point groups; and (e) setting the operation value for each teaching point group using the operation parameter.

According to a second aspect of the present disclosure, there is provided a robot system. The robot system includes: a robot; a control section configured to control the robot; and a display section coupled to the control section. The control section executes: (a) processing for acquiring three or more plurality of teaching points; (b) processing for displaying the plurality of teaching points on the display section; (c) processing for acquiring a result of classification processing for classifying the plurality of teaching points into one or more teaching point groups, at least one of the one or more teaching point groups including at least three teaching points among the plurality of teaching points; (d) processing for acquiring an operation parameter used to set an operation value for each teaching point group among the one or more teaching point groups; and (e) processing for setting the operation value for each teaching point group using the operation parameter.

According to a third aspect of the present disclosure, there is provided a non-transitory computer-readable storage medium storing a computer program for causing a processor to execute teaching control for a robot that executes work for a work target object. The computer program causes the processor to execute: (a) processing for acquiring three or more plurality of teaching points; (b) processing for displaying the plurality of teaching points on a display section; (c) processing for acquiring a result of classification processing for classifying the plurality of teaching points into one or more teaching point groups, at least one of the one or more teaching point groups including at least three teaching points among the plurality of teaching points; (d) processing for acquiring an operation parameter used to set an operation value for each teaching point group among the one or more teaching point groups; and (e) processing for setting the operation value for each teaching point group using the operation parameter.

BRIEF DESCRIPTION OF THE DRAWINGS

FIG. 7 is an explanatory diagram showing another modification of FIG. 5 in the case in which operation values are limited.

DESCRIPTION OF EXEMPLARY EMBODIMENTS

Figure 1:
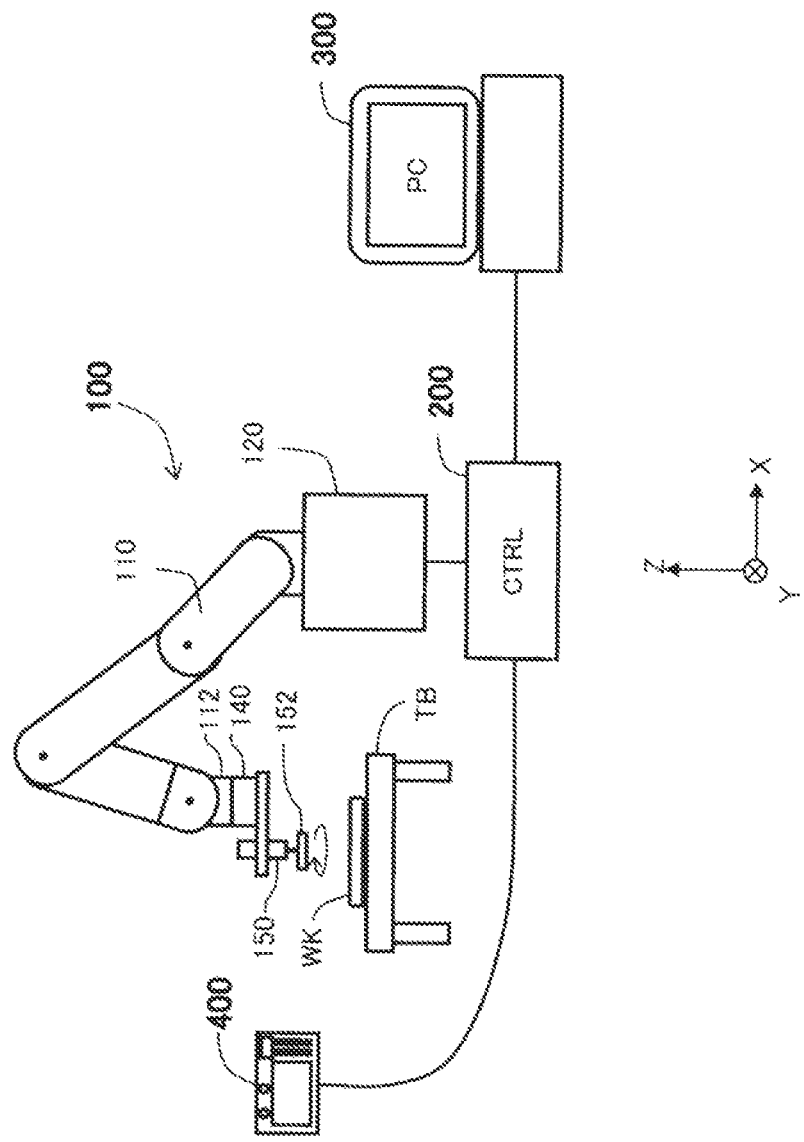
FIG. 1 is an explanatory diagram of a configuration example of a robot system.

FIG. 1 is an explanatory diagram showing an example of a robot system. The robot system includes a robot 100, a control device 200 that controls the robot 100, a personal computer 300, a teaching pendant 400. In FIG. 1, three directions X, Y, and Z perpendicular to one another are shown. The X direction and the Y direction are the horizontal direction. The Z direction is the vertical direction. These directions are illustrated in the other figures as well according to necessity.

The robot 100 includes an arm 110 and a base 120. The arm 110 is coupled by six joints in order. A force detecting section 140 and an end effector 150 are attached to an arm end 112, which is the distal end portion of the arm 110. In this embodiment, a polishing device is used as the end effector 150. A rotating body 152 attached with a polishing material is provided at the distal end of the end effector 150. The rotating body 152 is obtained by attaching a disc-like polishing material to a spindle. However, any end effector other than the polishing device can be used. A workpiece WK, which is a work target object of the robot 100, is set on a table TB. In this embodiment, a six-axis robot is illustrated. However, a robot including any arm mechanism including one or more joints can be used. The robot 100 in this embodiment is a vertical articulated robot. However, a horizontal articulated robot may be used.

The force detecting section 140 is a six-axis force sensor that measures an external force applied to the end effector 150. The force detecting section 140 includes three detection axes orthogonal to one another in a sensor coordinate system, which is a peculiar coordinate system, and detects the magnitude of force parallel to each detection axis and the magnitude of torque (moment of force) around each detection axis. The force parallel to each detection axis is referred to as "translational force". The torque around each detection axis is referred to as "rotational force". In this specification, the term "force" is used as meaning including both of the translational force and the rotational force.

The force detecting section 140 does not need to be the sensor that detects forces of six axes. A sensor that detects forces in a smaller number of directions may be used. Instead of providing the force detecting section 140 at the distal end of the arm 110, a force sensor functioning as a force detecting section may be provided in any one or more joints of the arm 110. The "force detecting section" only has to have a function of detecting force. That is, the "force detecting section" may be a device that directly detects force like a force sensor or may be a device that indirectly calculates force like an IMU (Inertial Measurement Unit) and a device that detects force from a current value of an actuator of the arm 110. The "force detecting section" may be externally attached to the robot 100 or may be incorporated in the robot 100.

The workpiece WK is polished by the rotating body 152 provided at the distal end of the end projector 150. During the polishing, the arm 110 is controlled such that force detected by the force detecting section 140 reaches a target force set in advance. This polishing work is work performed by force control based on an output of the force detecting section 140. However, the present disclosure is also applicable to work not involving force control.

Figure 2:
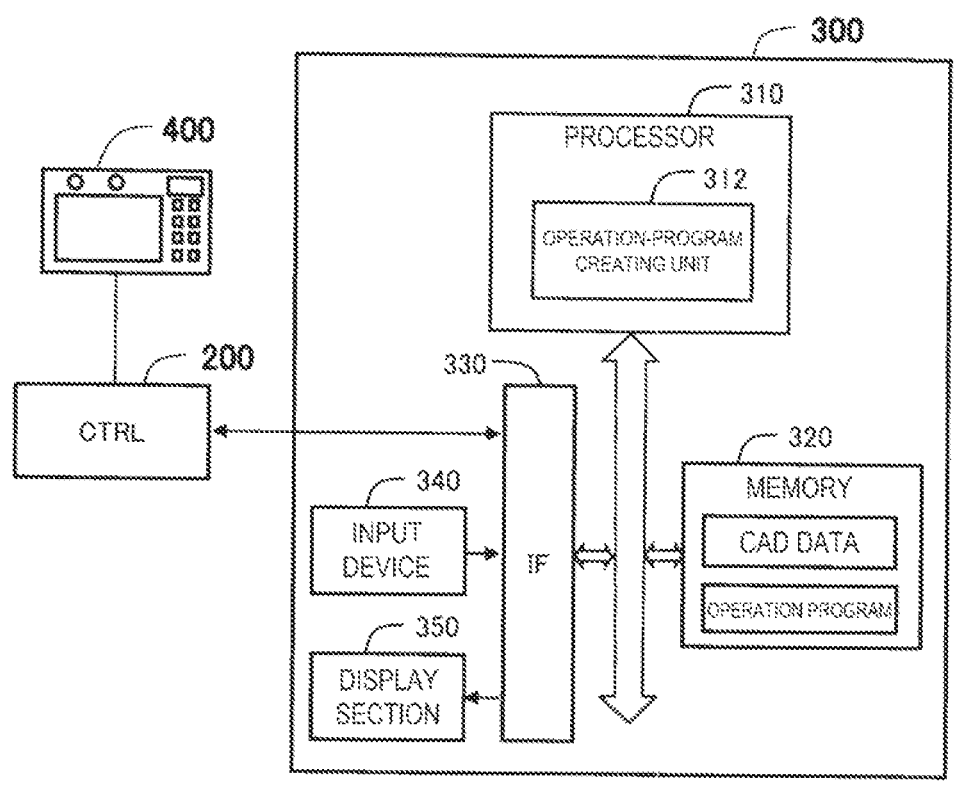
FIG. 2 is a functional block diagram of a personal computer.

FIG. 2 is a block diagram showing functions of the personal computer 300. The personal computer 300 includes a processor 310, a memory 320, an interface circuit 330, and an input device 340 and a display section 350 coupled to the interface circuit 330. The interface circuit 330 is coupled to the control device 200. The teaching pendant 400 is coupled to the control device 200.

The processor 310 functions as an operation-program creating section 312 that creates an operation program for the robot 100. The operation-program creating section 312 has a function of creating an operation program according to an instruction of an operator. The operation-program creating section 312 preferably further includes a simulator function for simulating the operation of the robot 100 according to the created operation program. The operation-program creating section 312 is realized by the processor 310 executing a computer program stored in the memory 320. However, the operation-program creating section 312 may be realized by a hardware circuit. CAD data of the workpiece WK and the operation program created by the operation-program creating section 312 are stored in the memory 320. The operation program is transferred to the control device 200 and stored. The control device 200 executes control of the robot 100 according to the operation program. The processor 310 is equivalent to the "control section" according to the present disclosure.

Figure 3:
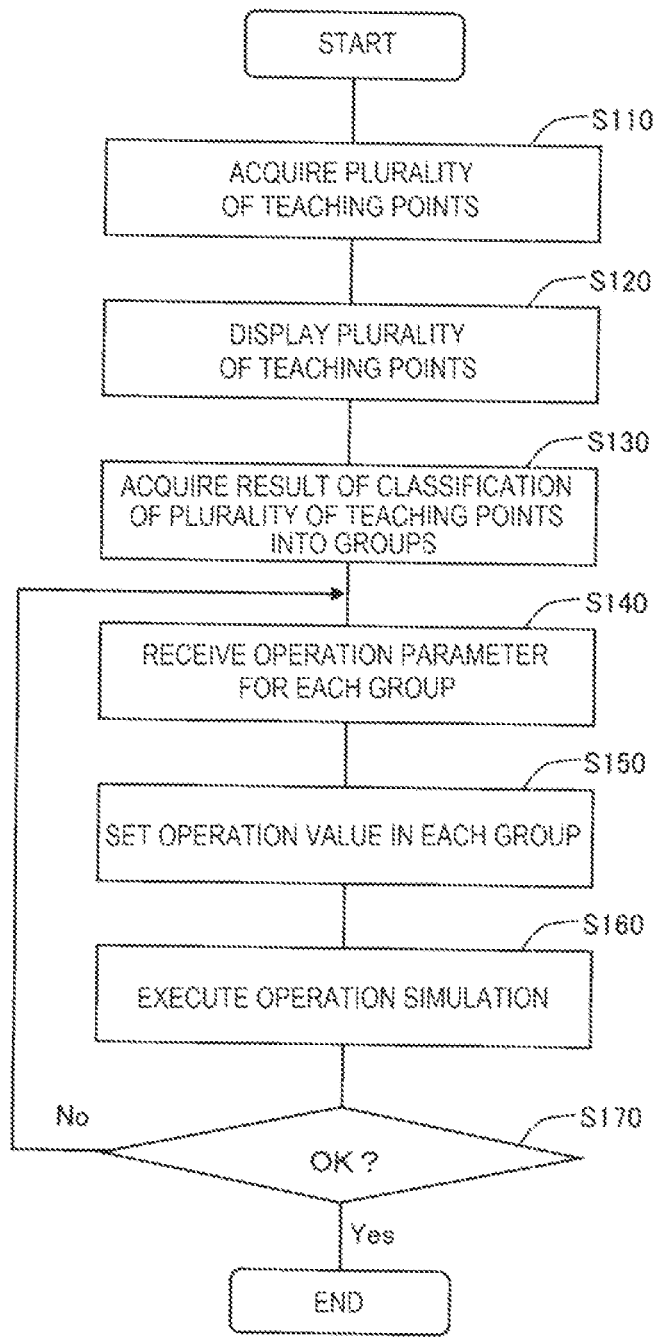
FIG. 3 is a flowchart showing a procedure for setting teaching point groups and operation values.

FIG. 3 is a flowchart showing a procedure for setting classification of teaching point groups and operation values for each teaching point group. Processing shown in FIG. 3 is a part of teaching processing executed by the operation-program creating section 312 when creating an operation program. A method of controlling the processing shown in FIG. 3 is referred to as "teaching control method" as well.

In step S110, the operation-program creating section 312 acquires a plurality of teaching points. In step S120, the operation-program creating section 312 displays the acquired plurality of teaching points on the display section 350. As a method of acquiring a teaching point, there are mainly two methods. A first acquiring method is a method of acquiring, via the control device 200, a teaching point input using the teaching pendant 400. As the first acquiring method, a method of acquiring a plurality of teaching points through direct teaching can also be used. The direct teaching is a method in which the operator moves the arm 110 to thereby teach the operation of the arm 110. A second acquiring method is a method of acquiring a coordinate point of CAD data of the workpiece WK as a teaching point. Specifically, for example, a plurality of coordinate points included in the CAD data are displayed on a screen. The operator can acquire a plurality of teaching points by selecting any coordinate points among the plurality of coordinate points. When acquiring the teaching point, it is preferable to simultaneously acquire an initial value of an operation value. The initial value of the operation value is input using the teaching pendant 400 or the input device 340 of the personal computer 300.

Figure 4:
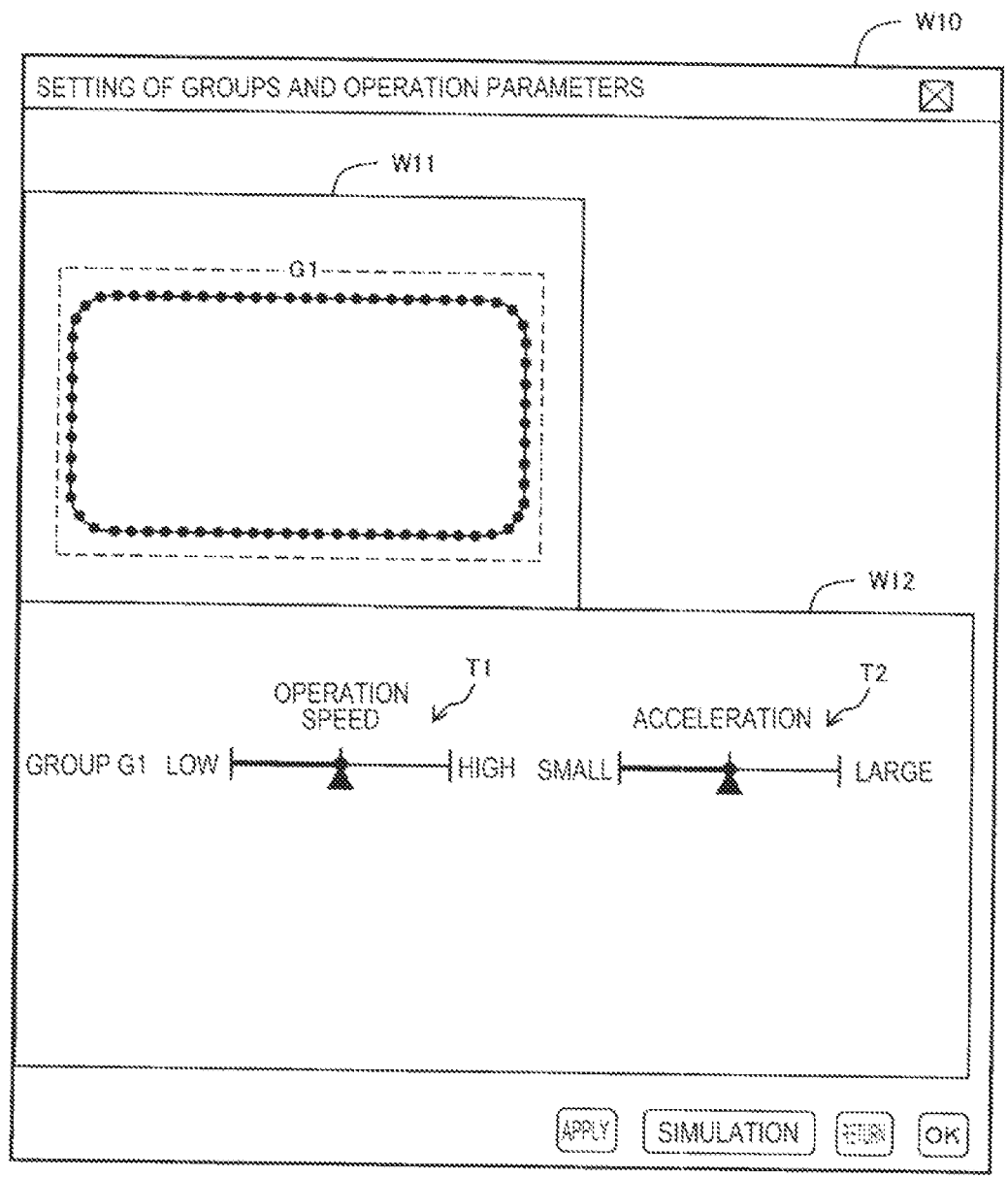
FIG. 4 is an explanatory diagram showing a state of setting teaching point groups and operation parameters.

FIG. 4 shows an example of a window W10 displayed on the display section 350 in step S120. The window W10 includes a grouping region W11 for classifying a plurality of teaching points into a teaching point group and a parameter setting region W12 for setting operation parameters for each teaching point group. The operation parameters are parameters used to set operation values of the robot 100 such as speed and acceleration. As shown in FIG. 4, at a point in time of step S120, the plurality of teaching points acquired in step S110 is classified as one group G1. In the present disclosure, the term "group" means a teaching point group. When a plurality of teaching points represent a track of the vertical articulated robot, since the track is a three-dimensional track, the track is preferably displayed in three dimensions. In the grouping region W11, fine adjustment of the positions of the teaching points and deletion of inappropriate teaching points may be performed.

In the example shown in FIG. 4, the parameter setting region W12 includes two setting tools T1 and T2 for setting operation parameters for each group. The operation parameter set by the first setting tool T1 is a parameter concerning operation speed of a TCP (Tool Center Point) of the robot 100. The operation speed is simply referred to as "speed" as well. The TCP can be set in any position near the arm end 112. However, usually, the TCP is set in a work position of the end effector 150. The operation parameter set by the second setting tool T2 is a parameter concerning the acceleration of the TCP. In the example shown in FIG. 4, the setting tools T1 and T2 are formed as sliders. However, tools of other kinds such as a field for inputting a numerical value and a pulldown menu for selecting one out of a plurality of candidate values may be used. If the sliders are used, there is an advantage that the operator can easily visually understand the operation parameters.

The setting tools T1 and T2 may be tools for designating the absolute values of operation values or may be tools for designating increases or decreases of the operation values from present values. In the latter case, the center of each of the setting tools T1 and T2 means that the present value of the operation value is not changed. The right side of the center means that the operation value is set to a value larger than the present value. The left side of the center means that the operation value is set to a value smaller than the present value. At this time, the operation parameter is set as, for example, a difference from the present value of the operation value or a coefficient for multiplying the present value.

The operator can set the operation parameters using one or both of the two setting tools T1 and T2. For example, when desiring to set only operation speed for a teaching point of each group, the operator may use only the first setting tool T1. When desiring to set only acceleration for the teaching point of each group, the operator may use only the second setting tool T2.

In the parameter setting region W12, as an operation parameter, besides the operation parameters concerning operation speed and acceleration, the operator may be able to set an operation parameter concerning an operation value of force control. The operation value of the force control is, for example, a pressing force.

In step S130, the operator classifies the plurality of teaching points into one or more groups in the grouping region W11 and the operation-program creating section 312 acquires a result of the classification. Various methods can be used as a method of classification into groups. For example, a first method is a method of selecting a plurality of teaching points with mouse click or touch operation. A second method is a method of selecting a plurality of teaching points by encircling a region including the plurality of teaching points. A third method is a method of selecting a start point and an end point of a plurality of teaching points to thereby select teaching points between the start point and the end point.

In step S130, the plurality of teaching points are classified into one or more groups. However, the number of groups is preferably set to two or more. At least one group preferably includes three or more teaching points. This is because, if groups are classified to include a larger number of teaching points, since the number of groups decreases, it is easier to perform setting work for operation parameters for each group.

In step S140, the operator sets operation parameters for each group and the operation-program creating section 312 receives the operation parameters.

Figure 5:
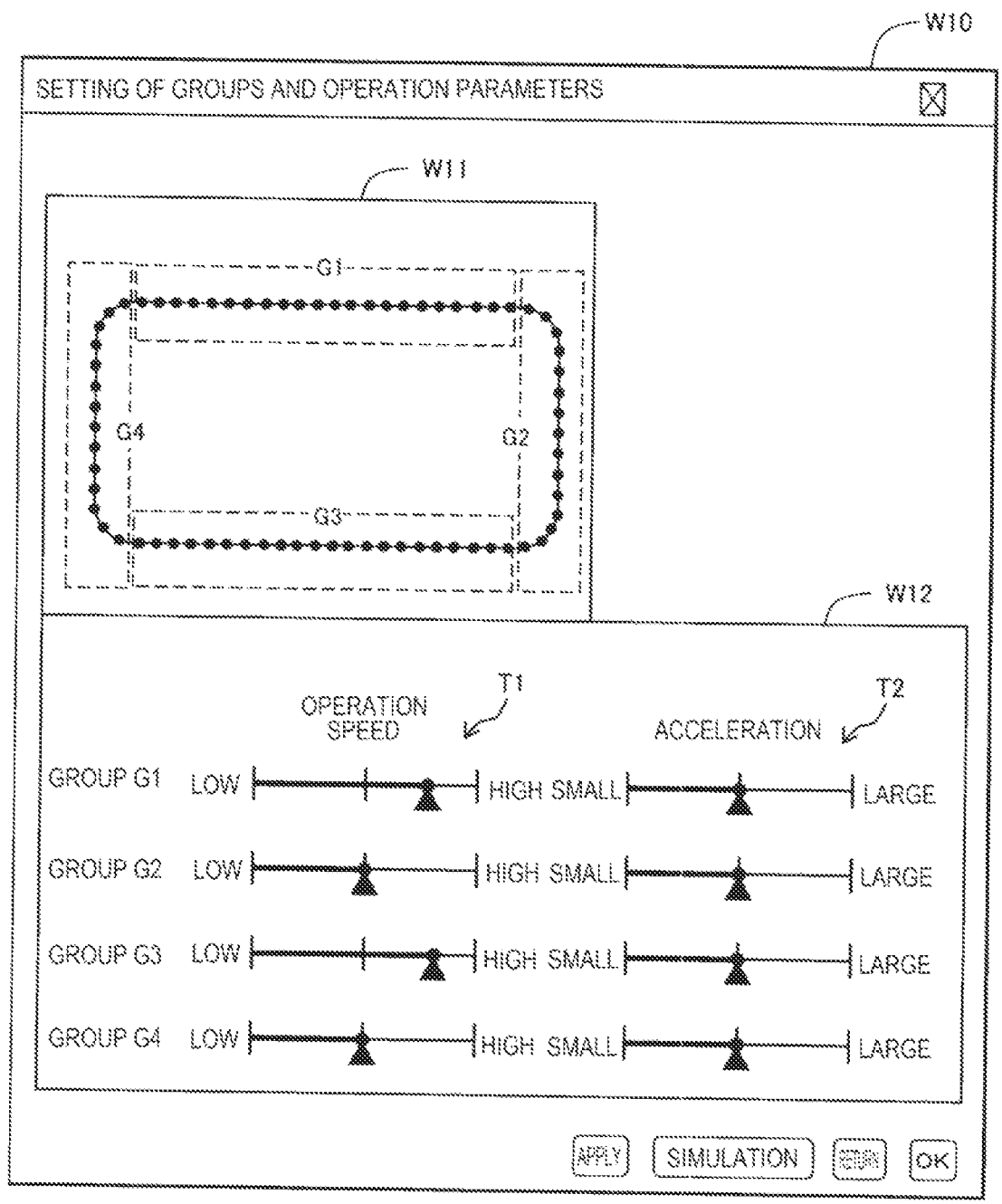
FIG. 5 is an explanatory diagram showing an example of a classification result of a teaching point group.

FIG. 5 is an explanatory diagram showing a state in which a plurality of teaching points are classified into four groups G1 to G4. The operator classifies the plurality of teaching points into the four groups G1 to G4 in the grouping region W11. At this time, a frame surrounding each group and an identification sign of each group are preferably displayed. All of the plurality of teaching points displayed in the grouping region W11 are preferably classified into any groups. In the parameter setting region W12, the setting tools T1 and T2 for operation parameters for each group are displayed. The operator can individually set the operation parameters for each group. In an example shown in FIG. 5, operation parameters of operation speed and acceleration for each group are set using the setting tools T1 and T2 formed as sliders. Force control parameters are set in the same manner. When an "apply" button in the window W10 is pressed, the operation-program creating section 312 acquires the set classification of each group and the operation parameters for each group.

When a teaching point having a limited range in which operation values can be set is included in a certain group, a settable range of operation parameters in the parameter setting region W12 is preferably displayed in a state in which the range is automatically changed to a changeable range. As an example of the range, for example, examples shown in FIGS. 6 and 7 explained below can be used.

Figure 6:
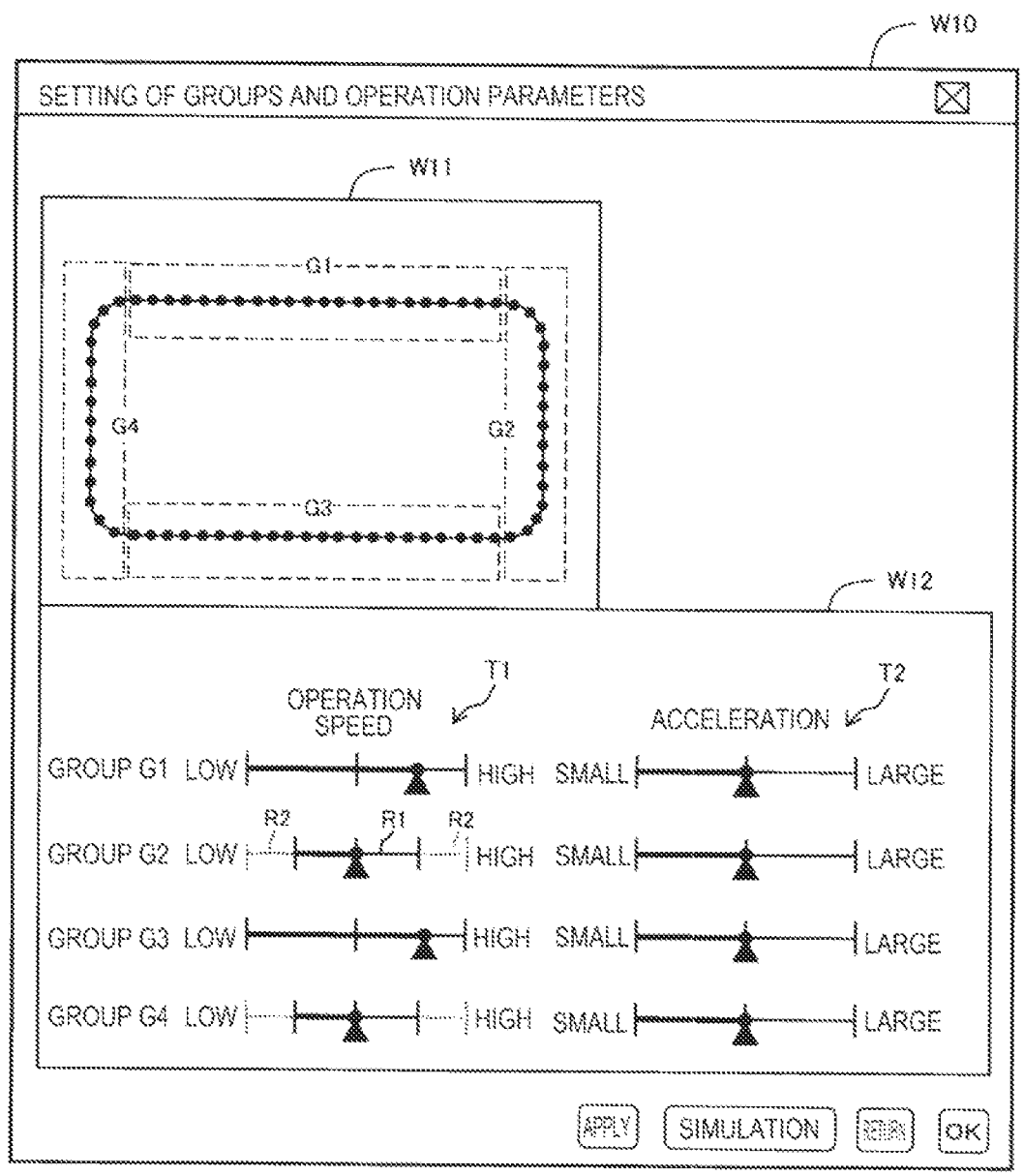
FIG. 6 is an explanatory diagram showing a modification of FIG. 5 in the case in which operation values are limited.

FIG. 6 is an explanatory diagram showing a modification of FIG. 5 in the case in which operation values are limited. In this example, in the parameter setting region W12, an entire range of an operation parameter of operation speed of the group G2 is visually distinguished as a settable range R1 and an un-settable ranges R2 and displayed. The same applies to the group G4. The operator can set the operation parameter of the operation speed only in the settable range R1. A settable range may be changed about acceleration as well.

The limitation of the operation values explained above often occurs according to curvatures of tracks at the teaching points belonging to each group. Therefore, a settable range of the setting tool T1 may be changed according to a curvature of a track at a teaching point. Specifically, when the curvature of the track at the teaching point is large, an operation parameter of an operation value is limited to a small range. In this way, the settable range of the setting tool T1 can be appropriately changed according to the curvature of the track formed by the teaching point. A curvature of a track at a certain teaching point can be calculated from, for example, the radius of a circle defined by three continuous teaching points centering on the teaching point. Alternatively, when the CAD data of the workpiece WK can be used, a curvature of a surface at the teaching point can be acquired from the CAD data.

FIG. 7 is an explanatory diagram showing another modification of FIG. 5 in the case in which operation values are limited. In this example, in the parameter setting region W12, the size of the slider of the setting tool T1 of the group G2 is the same. However, an upper limit value and a lower limit value are changed such that the operator can recognize that the settable range of the setting tool T1 is a range narrower than a range of −100% to 100%, which is a normal entire range. The same applies to the group G4. The operator can set the operation parameter of the operation speed only in this narrow range.

If the settable range of the operation parameter is displayed in a range individually determined for each group as in the examples shown in FIGS. 6 and 7, the operation parameter can be easily set using a setting tool having a settable range suitable for each group. On the other hand, if the settable range of the operation parameter is displayed in the same range about all the groups as in the example shown in FIG. 5, the operation parameter can be easily set using a setting tool having a settable range common to each group.

In step S150, the operation-program creating section 312 sets operation values for each group using the operation parameters set in step S140. When an operation parameter is set as a difference from the present value of the operation value or a coefficient for multiplying the present value as explained above, new operation values of operation speed and acceleration are set for each teaching point pair belonging to each group using the operation parameter. On the other hand, when an operation parameter is set as the absolute value of an operation value, a value itself of the operation parameter is set as a new operation value. The "teaching point pair" means any two teaching points continuously in a track formed by a plurality of teaching points. A force control parameter such as a pressing force is set not for each teaching point pair but for an individual teaching point. In the present disclosure, the term "an operation value is set for each group" is used as meaning including both of such two cases.

In the examples shown in FIGS. 4 to 7, speed or acceleration is set for each teaching point pair belonging to each group as an operation value. The term "speed or acceleration" in the present disclosure is used to mean only the speed, only the acceleration, and both of the speed and the acceleration. For example, both of the speed and the acceleration can be set as target values for a certain teaching point pair. In this case, operation in which the TCP of the robot 100 moves from a first teaching point to a second teaching point of the teaching point pair is assumed. In the operation, the robot 100 is controlled to cause the TCP to start movement from the first teaching point, move at target acceleration until speed of the TCP reaches target speed, and reach the second teaching point while maintaining the target speed after the speed reaches the target speed.

When step S150 ends, the operation-program creating section 312 creates an operation program according to the conditions set up to step S150 and stores the operation program in the memory 320.

In step S160, the operation-program creating section 312 executes an operation simulation of the robot 100 according to the operation program. The operation simulation is started by the operator pressing a "simulation" button in the window W10.

In step S170, the operator observes the operation simulation performed in step S160 and determines whether the setting of the operation values is appropriate. When the setting of the operation values is inappropriate, the processing returns to step S140 and the operator adjusts the operation parameters for each group according to necessity. When receiving the adjusted operation parameters, the operation-program creating section 312 executes steps S150 to S170 again. When it is confirmed that the setting of the operation values is appropriate, the processing shown in FIG. 3 is ended.

As explained above, in the embodiment, a plurality of teaching points are classified into one or more groups and operation values are set for each group. Therefore, it is possible to easily perform teaching work.

Other Embodiments

The present disclosure is not limited to the embodiment explained above and can be realized by various aspects without departing from the gist of the present disclosure. For example, the present disclosure can be realized by aspects explained below. Technical features in the embodiment explained above corresponding to technical features in the aspects explained below can be replaced or combined as appropriate in order to solve a part or all of the problems of the present disclosure or in order to achieve a part or all of the effects of the present disclosure. If the technical features are not explained as essential technical features in this specification, the technical features can be deleted as appropriate.

(1) According to a first aspect of the present disclosure, there is provided a teaching control method for creating an operation program for a robot. The teaching control method includes: (a) acquiring three or more plurality of teaching points; (b) displaying the plurality of teaching points on a display section; (c) acquiring a result of classification processing for classifying the plurality of teaching points into one or more teaching point groups, at least one of the one or more teaching point groups including at least three teaching points among the plurality of teaching points; (d) receiving an operation parameter used to set an operation value for each teaching point group among the one or more teaching point groups; and (e) setting the operation value for each teaching point group using the operation parameter.

With the teaching control method, the plurality of teaching points are classified into one or more groups and the operation value is set for each group. Therefore, it is possible to easily perform teaching work.

(2) In the teaching control method, the operation value may be speed or acceleration for a teaching point pair belonging to each teaching point group.

With the teaching control method, it is possible to easily set the speed or the acceleration for each teaching point pair.

(3) In the teaching control method, (d) the receiving of the operation parameter may include displaying, about each teaching point group, a setting tool for setting the operation parameter on the display section, and a settable range of the operation parameter in the setting tool may be displayed in a same range about all of the one or more teaching point groups.

With the teaching control method, it is possible to easily set the operation parameter using the setting tool having the settable range common to each teaching point group.

(4) In the teaching control method, (d) the receiving of the operation parameter may include displaying, about each teaching point group, a setting tool for setting the operation parameter on the display section, and a settable range of the operation parameter in the setting tool may be displayed in a range individually set for each teaching point group.

With the teaching control method, it is possible to easily set the operation parameter using the setting tool having the settable range suitable for each teaching point group.

(5) In the teaching control method, the settable range of the setting tool may be changed according to a curvature of a track at the teaching point.

With the teaching control method, it is possible to appropriately change the settable range of the setting tool according to the curvature of the track formed by the teaching point.

(6) According to a second aspect of the present disclosure, there is provided a robot system. The robot system includes: a robot; a control section configured to control the robot; and a display section coupled to the control section. The control section executes: (a) processing for acquiring three or more plurality of teaching points; (b) processing for displaying the plurality of teaching points on the display section; (c) processing for acquiring a result of classification processing for classifying the plurality of teaching points into one or more teaching point groups, at least one of the one or more teaching point groups including at least three teaching points among the plurality of teaching points; (d) processing for acquiring an operation parameter used to set an operation value for each teaching point group among the one or more teaching point groups; and (e) processing for setting the operation value for each teaching point group using the operation parameter.

With the robot system, the plurality of teaching points are classified into one or more groups and the operation value is set for each group. Therefore, it is possible to easily perform teaching work.

(7) According to a third aspect of the present disclosure, there is provided a non-transitory computer-readable storage medium storing a computer program for causing a processor to execute teaching control for a robot that executes work for a work target object. The computer program causes the processor to execute: (a) processing for acquiring three or more plurality of teaching points; (b) processing for displaying the plurality of teaching points on a display section; (c) processing for acquiring a result of classification processing for classifying the plurality of teaching points into one or more teaching point groups, at least one of the one or more teaching point groups including at least three teaching points among the plurality of teaching points; (d) processing for acquiring an operation parameter used to set an operation value for each teaching point group among the one or more teaching point groups; and (e) processing for setting the operation value for each teaching point group using the operation parameter.

With the non-transitory computer-readable storage medium storing the computer program, the plurality of teaching points are classified into one or more groups and the operation value is set for each group. Therefore, it is possible to easily perform teaching work.

The present disclosure can also be realized in various aspects other than the aspects explained above. The present disclosure can be realized in aspects such as a robot system including a robot and a robot control device, a computer program for realizing functions of the robot control device, and a non-transitory storage medium recording the computer program.

What is claimed is:

1. A teaching control method for causing a processor to perform a process, the teaching control method comprising executing on the processor the steps of:
acquiring a plurality of teaching points, a number of the plurality of teaching points being three or more;
displaying the plurality of teaching points on a display;
classifying the plurality of teaching points into one or more teaching point groups, at least one of the one or more teaching point groups including at least three teaching points among the plurality of teaching points, each of the one or more teaching point groups having at least one teaching point pair that is configured by two adjacent teaching points;
receiving an input indicating an operation parameter for each of the one or more teaching point groups via an input interface;
setting an acceleration and a speed for moving a control point of a robot between the two adjacent teaching points in the at least one teaching point pair of each of the one or more teaching point groups based on the operation parameter;
creating an operation program based on the set acceleration and the set speed; and
operating the robot based on the operation program,
wherein the set acceleration and the set speed are different among two groups of the one or more teaching point groups, and
the set acceleration and the set speed are the same for each of the at least one teaching point pair among each group of the one or more teaching point groups.

2. The teaching control method according to claim 1, wherein
the processor is configured to display, about each of the one or more teaching point groups, a setting tool for setting the operation parameter on the display, and
a settable range of the operation parameter in the setting tool is displayed in a same range about all of the one or more teaching point groups.

3. The teaching control method according to claim 1, wherein
the processor is configured to display, about each of the one or more teaching point groups, a setting tool for setting the operation parameter on the display, and
a settable range of the operation parameter in the setting tool is displayed in a range individually set for each of the one or more teaching point groups.

4. The teaching control method according to claim 3, wherein
the settable range of the setting tool is changed according to a curvature of a track at the plurality of teaching points.

5. A robot system comprising:
a robot;
a display;
a memory configured to store a program; and
a processor configured to execute the program so as to:
acquire a plurality of teaching points, a number of the plurality of teaching points being three or more;
display the plurality of teaching points on the display;
classify the plurality of teaching points into one or more teaching point groups, at least one of the one or more teaching point groups including at least three teaching points among the plurality of teaching points, each of the one or more teaching point groups having at least one teaching point pair that is configured by two adjacent teaching points;
receive an input indicating an operation parameter for each of the one or more teaching point groups via an input interface;
set an acceleration and a speed for moving a control point of the robot between the two adjacent teaching points in the at least one teaching point pair of each of the one or more teaching point groups based on the operation parameter;
create an operation program based on the set acceleration and the set speed; and
operate the robot based on the operation program,
wherein the set acceleration and the set speed are different among two groups of the one or more teaching point groups, and
the set acceleration and the set speed are the same for each of the at least one teaching point pair among each group of the one or more teaching point groups.

6. A non-transitory computer-readable storage medium storing a computer program for causing a computer to execute a process by a processor so as to perform the steps of:
acquiring a plurality of teaching points, a number of the plurality of teaching points being three or more;
displaying the plurality of teaching points on a display;
classifying the plurality of teaching points into one or more teaching point groups, at least one of the one or more teaching point groups including at least three teaching points among the plurality of teaching points, each of the one or more teaching point groups having at least one teaching point pair that is configured by two adjacent teaching points;
receiving an input indicating an operation parameter for each of the one or more teaching point groups via an input interface;
setting an acceleration and a speed for moving a control point of a robot between the two adjacent teaching points in the at least one teaching point pair of each of the one or more teaching point groups based on the operation parameter;
creating an operation program based on the set acceleration and the set speed; and
operating the robot based on the operation program,
wherein the set acceleration and the set peed are different among two groups of the one or more teaching point groups, and
the set acceleration and the set speed are the same for each of the at least one teaching point pair among each group of the one or more teaching point groups.

* * * * *